(12) United States Patent  
Iijima

(10) Patent No.: US 8,400,476 B2  
(45) Date of Patent: Mar. 19, 2013

(54) DISPLAY DEVICE, METHOD AND PROGRAM

(75) Inventor: Tadahiko Iijima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 12/261,227

(22) Filed: Oct. 30, 2008

(65) Prior Publication Data

US 2009/0122085 A1 May 14, 2009

(30) Foreign Application Priority Data

Nov. 9, 2007 (JP) ................................. 2007-292306

(51) Int. Cl.  
*G09G 5/00* (2006.01)

(52) U.S. Cl. ........................................ 345/661

(58) Field of Classification Search .............. 345/661  
See application file for complete search history.

(56) References Cited

U.S. PATENT DOCUMENTS

| | | | | |
|---|---|---|---|---|
| 5,596,346 | A * | 1/1997 | Leone et al. .................. | 345/667 |
| 6,052,110 | A * | 4/2000 | Sciammarella et al. ...... | 345/661 |
| 6,169,538 | B1 * | 1/2001 | Nowlan et al. ................ | 345/168 |
| 6,768,497 | B2 * | 7/2004 | Baar et al. ..................... | 345/661 |
| 7,526,738 | B2 * | 4/2009 | Ording et al. ................. | 715/862 |
| 8,009,146 | B2 * | 8/2011 | Pihlaja .......................... | 345/173 |
| 8,044,937 | B2 * | 10/2011 | Shin et al. ..................... | 345/168 |
| 2001/0038390 | A1 * | 11/2001 | Takaya et al. ................. | 345/671 |
| 2008/0036793 | A1 * | 2/2008 | Wang ............................ | 345/661 |

FOREIGN PATENT DOCUMENTS

| | | |
|---|---|---|
| JP | 08-133822 | 5/1996 |
| JP | 09-026850 A | 1/1997 |
| JP | 10-133639 | 5/1998 |
| JP | 10-207441 | 8/1998 |
| JP | 11-085453 A | 3/1999 |
| JP | 11-212727 A | 8/1999 |
| JP | 2001-272963 A | 10/2001 |

OTHER PUBLICATIONS

The above references were cited in a Japanese Office Action, which is enclosed without English Translation, that issued in Japanese Patent Application No. 2007-292306.

* cited by examiner

*Primary Examiner* — Ryan R Yang  
(74) *Attorney, Agent, or Firm* — Cowan, Liebowitz & Latman, P.C.

(57) ABSTRACT

A display device includes an acquisition unit configured to acquire coordinates on a display screen designated by a coordinate input apparatus; a registering unit configured to register an enlargement target which is to be enlarged; an enlargement processing unit configured to enlarge and display a partial area, which includes the enlargement target, if a positional relationship between coordinates acquired by the acquisition unit and a position at which the enlargement target, which has been registered by the registering unit, is displayed on the display screen satisfies a predetermined condition; and a cancellation processing unit configured to cancel the enlarged display of the partial area by the enlargement processing unit based upon an input from the coordinate input apparatus.

11 Claims, 11 Drawing Sheets

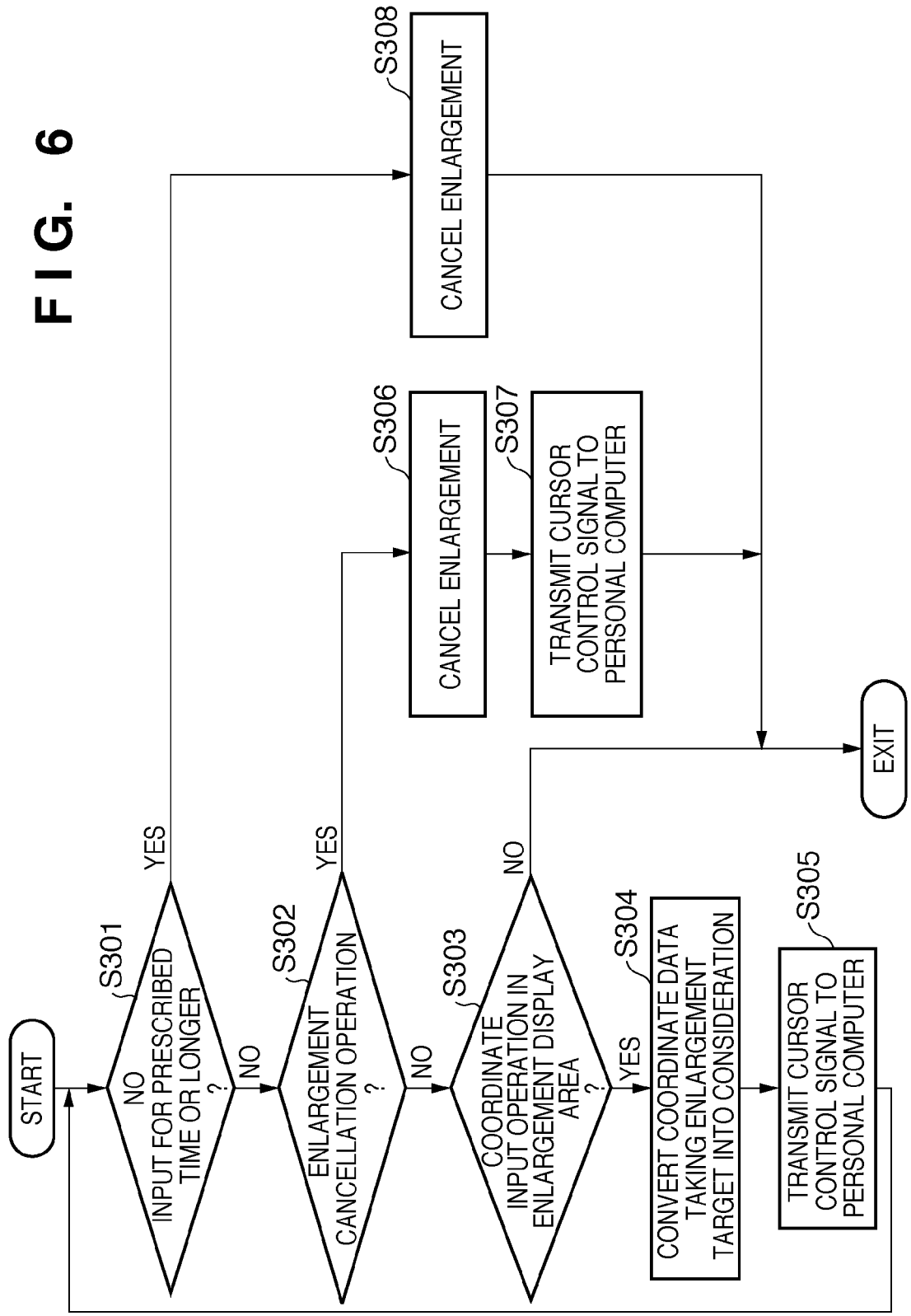

DISPLAY DEVICE, METHOD AND PROGRAM

BACKGROUND OF THE INVENTION

1. Field of the Invention

The present invention relates to enlargement processing based upon a coordinate input operation.

2. Description of the Related Art

An increase in the resolution of a computer is accompanied by an increase in the amount of information displayed on a display (e.g., a monitor).

However, problems that arise with an increase in the amount of displayed information have been reported. For example, in a case where a computer is operated using a graphical user interface, an increase in resolution is accompanied by a reduction in the size of an on-screen area in which an operations is to be performed. As a consequence, finer manipulation becomes necessary and there is increased likelihood that erroneous operation will occur. For example, a slider button, a window resizing area and a close button, etc., which are used when performing window control such as in a multiple-window system, become small and difficult to operate.

Further, when use is made of a display employed in a conference or the like, often an input device having a coordinate input function such as a pen, digitizer or touch-sensitive panel is used. However, in case of such input using absolute coordinates, coordinate input of higher precision is required as resolution rises. For example, in order to perform an input from a position that is slightly displaced from the display position in case of such a display device (e.g., a screen), there are instances where the difference between the tip of a pen and the display position, which difference is ascribable to the thickness of the screen, leads to erroneous operation.

A method whereby an image of fixed extent corresponding to a position indicated by a cursor is enlarged and displayed without hiding the cursor is known as a method of solving the above-mentioned problem (see Japanese Patent Application Laid-Open No. 10-133639). Also known is a method of reducing amount of movement of a mouse cursor or temporarily halting the movement thereof when the cursor is placed in an area for which a prescribed operation, such as movement of a window or a size change, has been set (see Japanese Patent Application Laid-Open No. 8-133822). According to another known method, when a menu panel is displayed and a cursor is moved into the area of the menu panel, the sensitivity of an cursor movement is lowered to thereby facilitate menu operation (see Japanese Patent Application Laid-Open No. 10-207441).

With the technique described in Japanese Patent Application Laid-Open No. 10-133639, the finer details of an area in which an operation is to be performed can be displayed by enlarging the vicinity of the cursor. However, since the sensitivity of cursor movement does not change, a fine operation is required in order to manipulate a coordinate input apparatus.

Further, the technique described in Japanese Patent Application Laid-Open No. 8-133822 is such that if the cursor passes through the prescribed area when the cursor is moved, the cursor slows down or stops temporarily within this area. The problem that arises is a decline in operability. Further, in the case of a coordinate input apparatus based upon absolute coordinates as entered by digitizer or pen, etc., it is not possible to diminish the cause erroneous operation.

Further, the drawbacks with the technique described in Japanese Patent Application Laid-Open No. 10-207441 are that there is no improvement in operability in areas other than the menu panel, and that there is no diminution in the cause of erroneous operation in the case of a coordinate input apparatus based upon absolute coordinates as entered by digitizer or pen, etc.

SUMMARY OF THE INVENTION

The present invention provides a display device, method and program adapted so as to improve operability relating to enlargement processing that is based upon a coordinate input operation.

According to a first aspect of the present invention, there is provided a display device comprising: an acquisition unit configured to acquire coordinates on a display screen designated by a coordinate input apparatus; a registering unit configured to register an enlargement target which is to be enlarged; an enlargement processing unit configured to enlarge and display a partial area, which includes the enlargement target, if a positional relationship between coordinates acquired by the acquisition unit and a position at which the enlargement target, which has been registered by the registering unit, is displayed on the display screen satisfies a predetermined condition; and a cancellation processing unit configured to cancel the enlarged display of the partial area by the enlargement processing unit based upon an input from the coordinate input apparatus.

According to a second aspect of the present invention, there is provided a display processing method of a display device, the method comprises the steps of: acquiring coordinates on a display screen designated by a coordinate input apparatus; registering an enlargement target which is to be enlarged; enlarging and displaying a partial area, which includes the enlargement target, if a positional relationship between coordinates acquired in the acquiring step and a position at which the enlargement target, which has been registered in the registering step, is displayed on the display screen satisfies a predetermined condition; and canceling the enlarged display of the partial area in the enlarging and displaying step based upon an input from the coordinate input apparatus.

According to a third aspect of the present invention, there is provided a display processing program stored on a computer-readable medium for causing a computer to function as: an acquisition unit configured to acquire coordinates on a display screen designated by a coordinate input apparatus; a registering unit configured to register an enlargement target which is to be enlarged; an enlargement processing unit configured to enlarge and display a partial area, which includes the enlargement target, if a positional relationship between coordinates acquired by the acquisition unit and a position at which the enlargement target, which has been registered by the registering unit, is displayed on the display screen satisfies a predetermined condition; and a cancellation processing unit configured to cancel the enlarged display of the partial area by the enlargement processing unit based upon an input from the coordinate input apparatus.

Further features of the present invention will become apparent from the following description of exemplary embodiments with reference to the attached drawings.

BRIEF DESCRIPTION OF THE DRAWINGS

FIG. 6 is a third flowchart illustrating an example of the flow of processing in the display device 201 shown in FIGS. 1 and 2;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
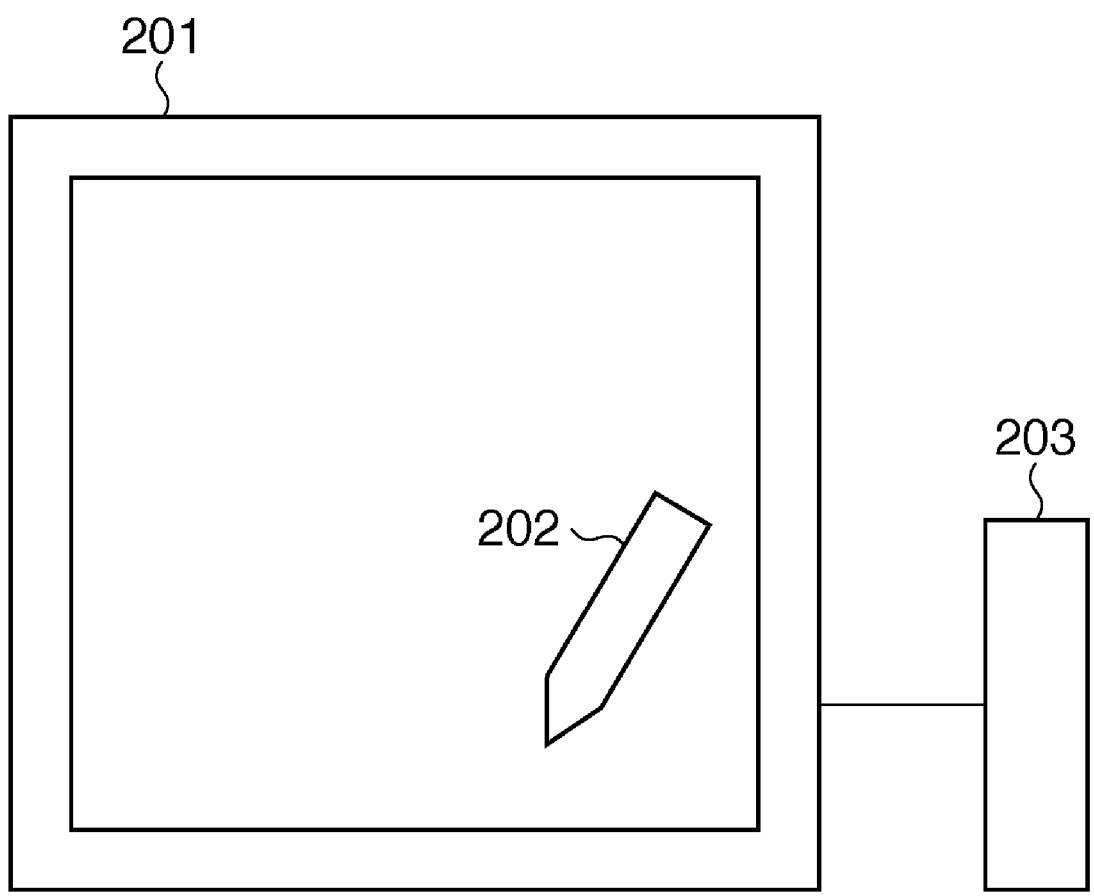
FIG. 1 is a diagram illustrating an example of an embodiment of a display device according to the present invention.

FIG. 1 is a diagram illustrating an example of an embodiment of a display device according to the present invention.

The display device 201 displays video on a display screen when a video signal is input thereto. The display device 201 comes with a pen 202, which has a pen button function and a coordinate input function that is obtained by cooperation with a coordinate input board overlaid on the display screen. An operating system having a graphical user interface has been installed personal computer 203, which outputs a video signal to the display device 201.

Figure 2:
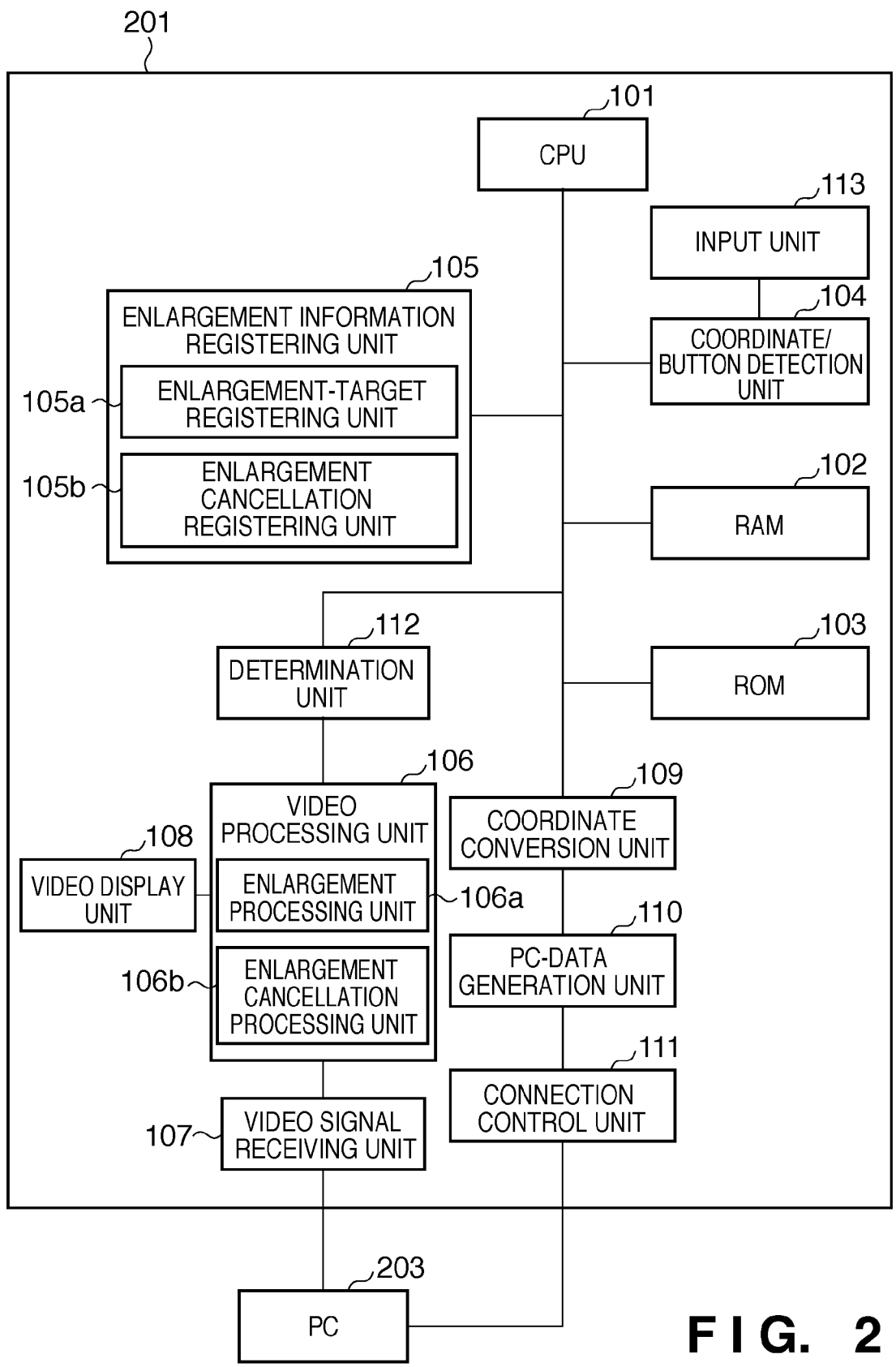
FIG. 2 is a block diagram illustrating an example of the functional configuration of a display device 201 shown in FIG. 1.

FIG. 2 is a block diagram illustrating an example of the functional configuration of the display device 201 shown in FIG. 1. Components identical with those shown in FIG. 1 are designated by like reference characters.

Input information, which is based upon pressing of the pen button or operation of the pen, is input to the interior of the device by an input unit 113. The input information includes coordinates designated by the pen 202 and ON/OFF information indicating whether the pen button is ON (pressed) or OFF (not pressed).

A coordinate/button detection unit 104 detects and acquires coordinates and the pen-button information based upon input information from the input unit 113. The coordinate/button detection unit 104 recognizes an image display area of the display device 201 as coordinate information and recognizes, as coordinate information, a position at which contact or non-contact between the pen 202 and the coordinate input board is detected. The coordinate/button detection unit 104 detects pen-down, namely a state in which the pen is in contact with the display surface, pen-up, namely a state in which the pen is not in contact with the display surface, and generates an operation event. It should be noted that the method of detecting coordinates can be a method in which pressure produced when the pen is contacted with the coordinate input board is detected by a sensor provided in the input board, as a result of which the contacted position (coordinates) is acquired, or an electromagnetic induction method in which a magnetic field, which is produced by the pen, is detected by a sensor provided in the input board, as a result of which the contacted position (coordinates) is acquired. Another known method is an ultrasonic surface acoustic wave method that detects the position of an object on a display screen by an ultrasonic oscillator and ultrasonic sensor disposed on the frame, etc., of the display screen, thereby obtaining a contacted position (coordinates). In addition, there is an infrared method in which infrared radiation transmitted from the pen is detected by a sensor within the device, as a result of which the contacted position (coordinates) is acquired. Any of these methods may be employed.

A coordinate conversion unit 109 converts the position (coordinates) of input coordinates in an area of enlarged display to the coordinates for the area prior to enlargement display. A PC-data generation unit 110 converts coordinates and pen-down information to a data format used by the personal computer 203 and creates data for the personal computer. A connection control unit 111 controls connection to the personal computer 203.

An enlargement information registering unit 105 includes an enlargement-target registering unit 105a that performs a function for registering information relating to enlargement and registers an enlargement target, which is a target that is to be displayed in enlarged form, and an enlargement cancellation registering unit 105b for registering a method of operation that is for the purpose of canceling an enlarged display. A slider button, a window resizing area and a close button, etc., can be mentioned as targets for an enlarged display.

A video signal receiving unit 107 receives the video signal from the personal computer 203, and a video display unit 108 presents a display based upon the video signal accepted from the video signal receiving unit 107 via a video processing unit 106. A determination unit 112 determines whether enlargement is to be performed or cancelled. This determination is made based upon input information from the input unit 113 and settings information that has been registered by the enlargement information registering unit 105.

The video processing unit 106 includes an enlargement processing unit 106a that performs a function for processing video and presents an enlarged display of a prescribed partial area in the video, and an enlargement cancellation processing unit 106b for canceling the enlarged display of the prescribed partial area that has been enlarged. Enlargement and cancellation of enlargement are performed based upon the result of the determination made by the determination unit 112.

A CPU (Central Processing Unit) 101 controls various inputs and outputs and executes data processing, etc. A RAM (Random-Access Memory) 102 stores results of computation and data temporarily. A ROM (Read-Only Memory) 103 stores a program for executing control relating to this embodiment, as well as data. It should be noted that some or all of the above-described function blocks may be implemented using a special-purpose circuit board, etc., or may be implemented by having the CPU 101 execute a program that has been stored in the ROM 103.

Figure 3:
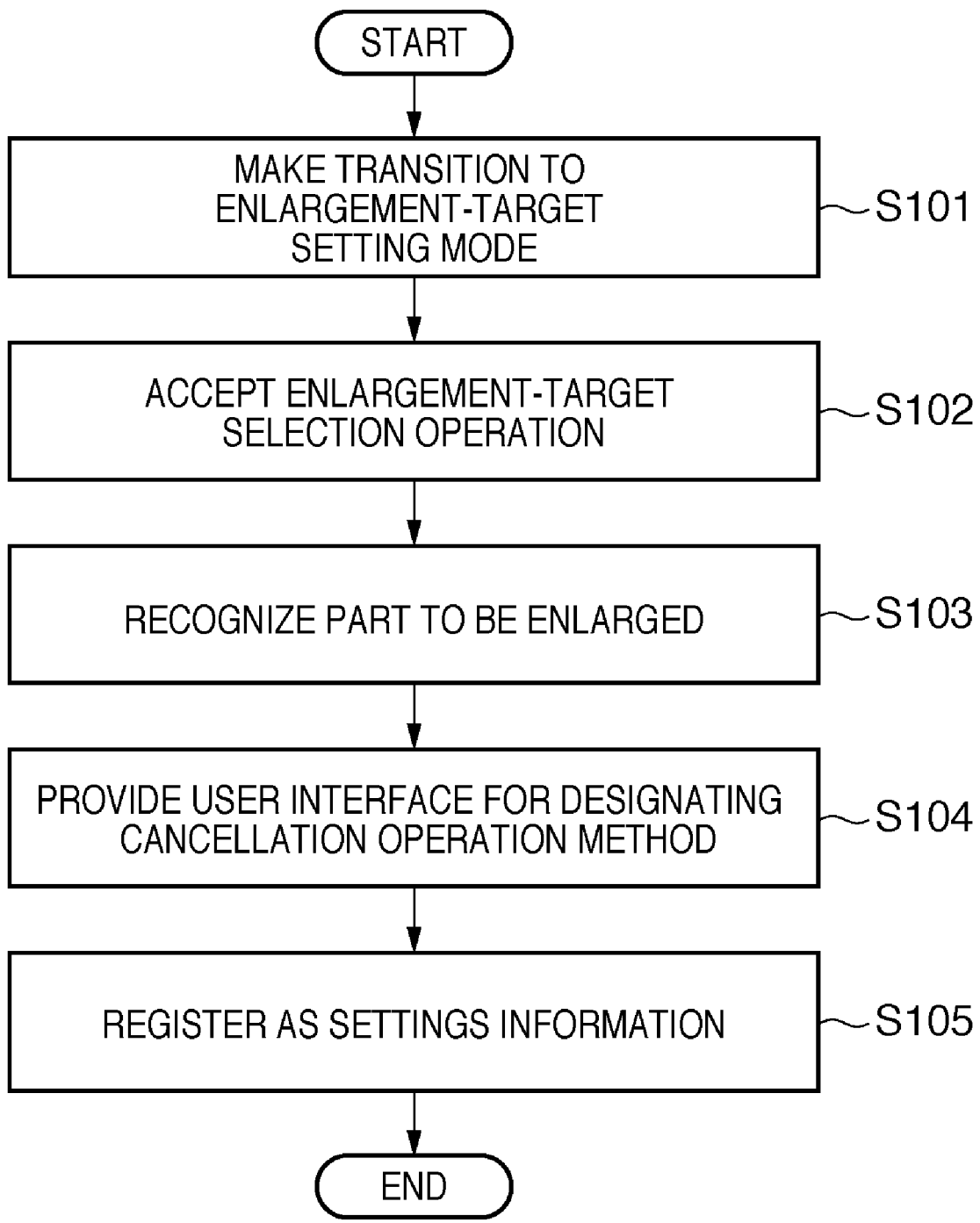
FIG. 3 is a first flowchart illustrating an example of the flow of processing in the display device 201 shown in FIGS. 1 and 2.

FIG. 3 is a first flowchart illustrating an example of the flow of processing in the display device 201 shown in FIGS. 1 and 2.

The display device 201 first transitions to an enlargement-target setting mode in response to a mode setting operation performed by the user (S101). When the transition to this mode is made, the display device 201 accepts an enlargement-target selection operation performed by the user (S102). The operation for selecting an enlargement target is performed by using the pen 202 to enclose the part to be enlarged and designating the area that includes this enlargement target.

When the selection operation is performed, the CPU 101, etc., causes the display device 201 to recognize the part (e.g., a close button) to be enlarged (S103). A pattern matching technique, for example, may be used to perform this recognition. In the case of pattern matching, pattern information of a part registered previously and the image within the designated area are subjected to pattern matching, whereby the part to be enlarged is recognized and extracted from the designated area. Pattern information necessary when pattern matching is performed is stored beforehand in the ROM 103, etc.

When recognition is completed, the display device 201 provides a user interface for designating a cancellation operation method that is for the purpose of canceling the enlarged display of the enlargement target (S104). When settings are completed and a settings completion indication is made by the user, the display device 201 uses the enlargement information registering unit 105 to register the set information in the ROM 103 (S105). This processing is then exited. It should be noted that when this information is registered, information that includes the size of the part set as the enlargement target and the position of the part on the display screen is registered.

Figure 4A:
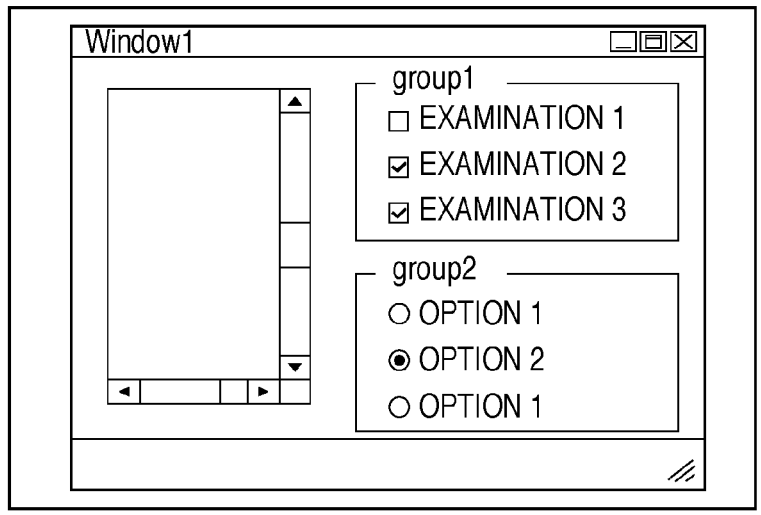
FIGS. 4A to 4C are diagrams illustrating an example of the transition of the display in the processing shown in FIG. 3.
Figure 4B:
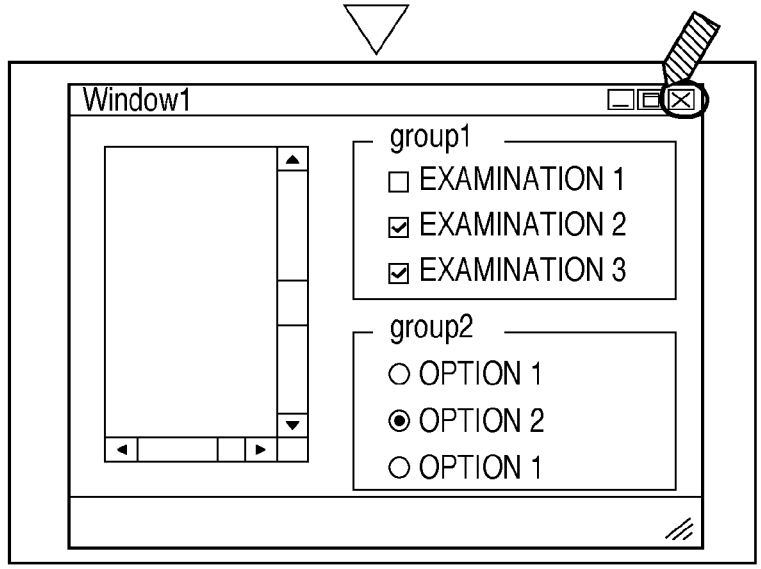
Figure 4C:
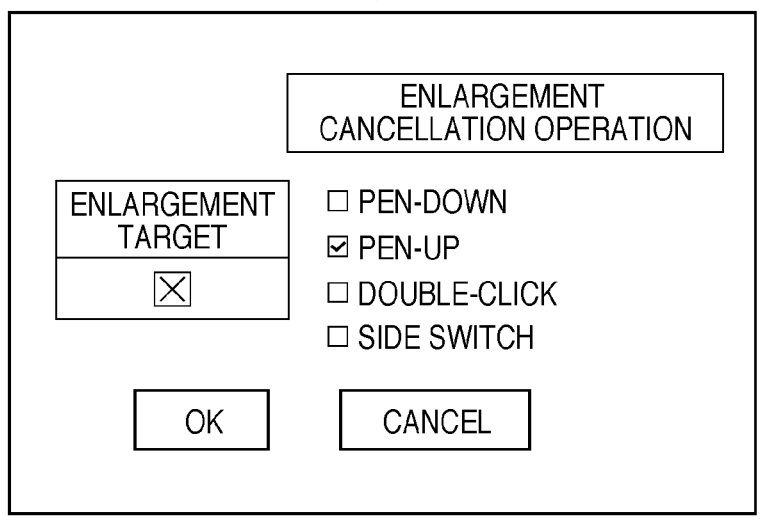

FIGS. 4A to 4C are diagrams illustrating an example of the transition of the display in the processing shown in FIG. 3. A case where a close button has been designated as the enlargement target will be taken as an example.

In FIG. 4A, after the transition is made to the enlargement-target setting mode. Thereafter, the close button is encircled by the pen 202 to thereby select the close button as the enlargement target (S101, S102). This is illustrated in FIG. 4B. When the display device 201 receives the selection of the enlargement target in FIG. 4B, the display device recognizes the part (the close button in this case), which is the enlargement target, from within the encircled area (S103).

When recognition of the enlargement target is completed, the display device 201 provides the user interface, as shown in FIG. 4C, for designating the operation that will be used to cancel the enlargement (S104. In this case, check boxes (a plurality of which are selectable) that make it possible to designate pen-down, pen-up, double-click and side switch as enlargement-target cancellation operations are provided on this interface. Further, an area for displaying the recognized part that is the enlargement target is also provided on the same interface. Accordingly, if pen-up, for example, is designated and an OK button is pressed, the settings information, which adopts the close button as the enlargement target and adopts pen-up as the method of canceling this enlargement, is registered (S105).

Figure 5:
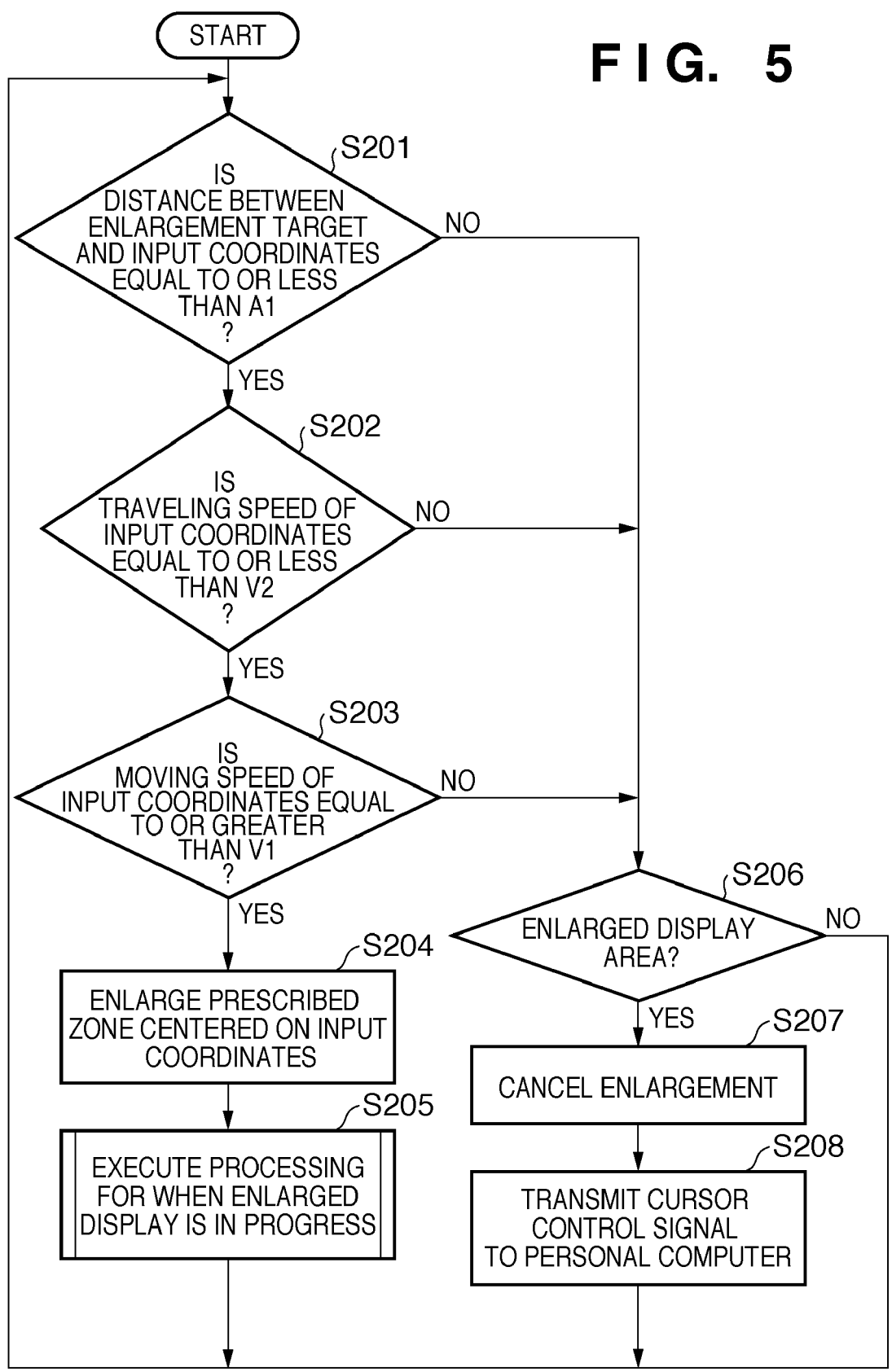
FIG. 5 is a second flowchart illustrating an example of the flow of processing in the display device 201 shown in FIGS. 1 and 2.

FIGS. 5 and 6 are flowcharts illustrating an example of the flow of enlargement processing and enlargement cancellation processing in the display device 201 described above with reference to FIGS. 1 and 2. For the sake of explanation, it will be assumed that the enlargement target and enlargement cancellation method have already been set by the processing described above with reference to FIG. 3.

When processing starts in FIG. 5, the display device 201 monitors the operation of coordinate input by the pen 202 using the input unit 113. Then, using the determination unit 112, the display device 201 determines whether this operation satisfies a predetermined condition. Specifically, it is determined whether the distance between the display position of the enlargement target and the input coordinates is equal to or less than a prescribed distance (A1 in this case) and whether the moving speed of the input coordinates is within a prescribed range of speeds (equal to or greater than V1 and equal to or less than V2 in this case). If the result of the determination is that the distance between the enlargement target and the input coordinates is equal to or less than A1 ("YES" at S201), then it is determined whether the moving speed of the input coordinates is equal to or less than V2. If the moving speed of the input coordinates is equal to or less than V2 ("YES" at S202), then it is determined whether the moving speed of the input coordinates is equal to or greater than V1 (S203).

If a "NO" decision is rendered at any of the steps S201, S202, and S203 and there is an enlarged display area on the display screen ("YES" at S206), then the enlargement cancellation processing unit 106b cancels the enlargement of this area (S207). The display device 201 then transmits a cursor control signal to the personal computer 203 (S208) and processing returns to step S201.

Further, if "YES" decisions are rendered at S201 and S202 and the moving speed of the input coordinates is equal to or greater than V1 ("YES" at S203), then the display device 201 uses the enlargement processing unit 106a to enlarge a rectangular area of a prescribed size the center of which is the position of the input coordinates and which contains the enlargement target (S204). The display device 201 then executes the processing of S205 for when an enlarged display is in progress. Processing then returns to S201.

Next, the flow of the processing of S205 will be described with reference to FIG. 6.

When this processing starts in FIG. 6, the determination unit 112 determines whether an input using the pen 202 has not been made for a prescribed period of time or longer (S301). If there is no input for the prescribed period of time or longer ("YES" at S301), the then the enlargement cancellation processing unit 106b cancels the enlargement operation that was performed at S204 (S308). This processing is then exited.

If there is an input before the prescribed period of time elapses ("NO" at S301), it is determined whether the input is an enlargement cancellation operation (S302). If the input is an enlargement cancellation operation ("YES" at S302), then the enlargement cancellation processing unit 106b cancels the enlargement operation that was performed at S204 (S306) and transmits the cursor control signal, which corresponds to the enlargement cancellation operation, to the personal computer 203 (S307), after which this processing is exited.

Further, if the input is not an enlargement cancellation operation ("NO" at S302), then it is determined whether the input is a coordinate input operation in the enlarged display area (S303). If the coordinate input is outside the enlarged display area ("NO" at S303), then processing is exited as is. On the other hand, if the coordinate input is in the enlarged display area ("YES" at S303), then the coordinate conversion unit 109 converts these entered coordinates taking the enlarged area into consideration (S304). That is, the position (coordinates) of the input coordinates in the enlarged area is converted to the coordinate information for the enlarged area prior to enlargement display. The display device 201 then transmits the cursor control signal to the personal computer 203 (S305), after which processing returns to S301.

In the description above, it is stated that A1, V1, V2 have been set in advance. However, it may be so arranged that the values of A1, V1, V2 can be set when the enlargement target is designated. Furthermore, it may be so arranged that values set when the enlargement target is designated can be changed afterward. The values may be different for each enlargement target or common values may be provided for all or some enlargement targets.

Further, in the description above, an enlarged display is presented if the distance between the enlargement target and the input coordinates is equal to or less than a prescribed distance (i.e., equal to or less than A1) and, moreover, the moving speed of the input coordinates is within the prescribed range of speeds (equal to or greater than V1 and equal to or less than V2). However, this processing can be changed as appropriate. For example, it may be so arranged that the enlarged display is presented at the moment the distance between the enlargement target and the input coordinates falls below the prescribed distance irrespective of the moving speed, or it may be so arranged that whether the enlarged display is presented or not is decided taking conditions other than these into account.

Further, in the description above, a case where the enlarged display is presented with the position of the input coordinates taken as the center is described. However, as long as the area containing the enlargement target can be enlarged, the enlarged display may be presented with any position as the starting point. For example, it may be so arranged that the enlarged display is presented with the enlargement target (e.g., a close button) as the center. It should be noted that the form of the enlarged display is not limited to a rectangular shape and may just as well be circular or elliptical, etc. Furthermore, it may be so arranged that the size of the enlargement zone can be set.

An example of transition of the form of the display in the processing described with reference to FIGS. 5 and 6 will now be described.

Figure 7A:
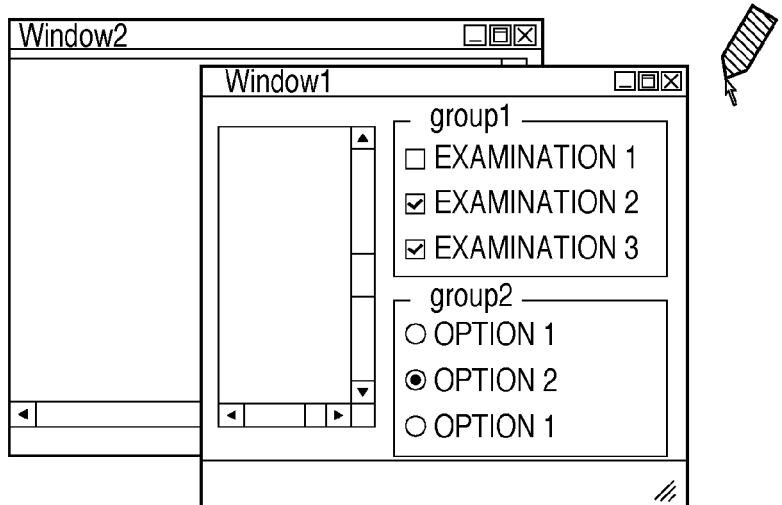
FIGS. 7A to 7C are diagrams illustrating an example of the transition of the display in the processing shown in FIGS. 5 and 6.
Figure 7B:
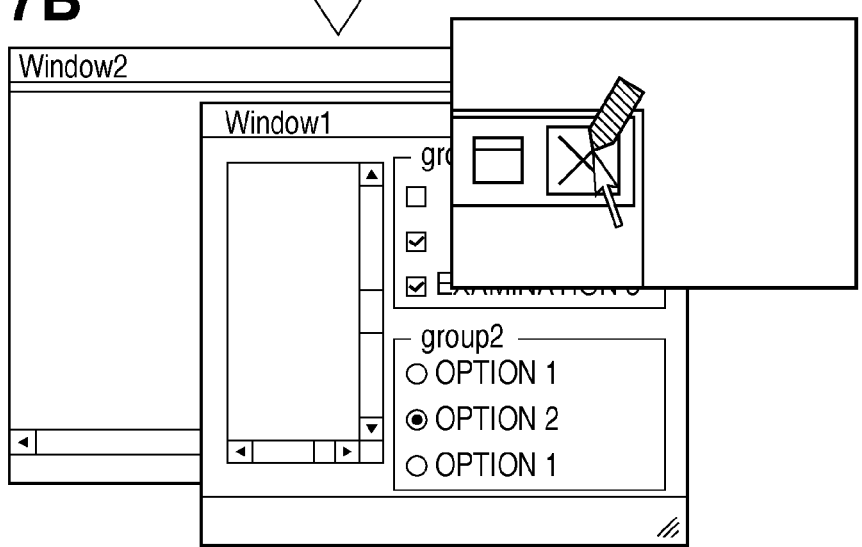
Figure 7C:
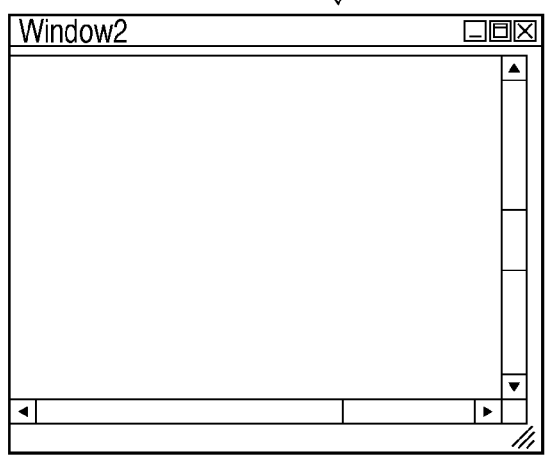

FIGS. 7A to 7C are diagrams illustrating an example of the transition of the display in a case where the close button has been designated as the enlargement target and the enlargement cancellation operation has been designated as pen-up.

In FIG. 7A, when the moving speed of the input coordinates is equal to or greater than V1 and equal to or less than V2 and, moreover, the coordinates approach the close button to a distance of equal to or less than A1, the enlarged display is presented with the position of the input coordinates as the center, as shown in FIG. 7B (S201 to S204). In FIG. 7B, the close button is pressed on the enlarged display area and the pen is then raised (pen-up), whereupon the enlarged display is cancelled. In FIG. 7C, the cursor control signal indicating pressing of the close button is transmitted to the personal computer 203, and therefore closing of the window is executed (S301 to S307).

Figure 8A:
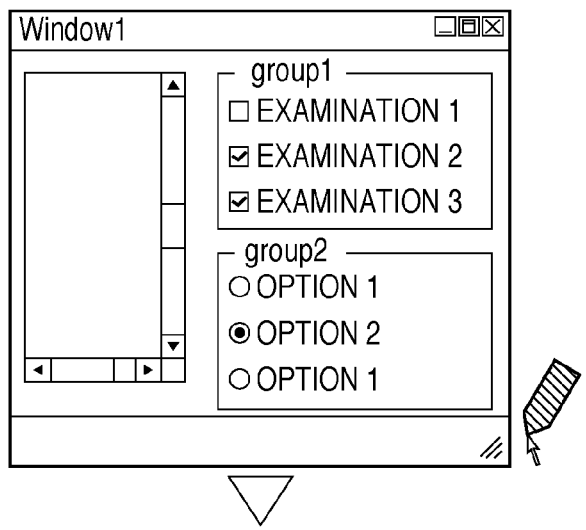
FIGS. 8A to 8C are diagrams illustrating an example of the transition of the display in the processing shown in FIGS. 5 and 6.
Figure 8B:
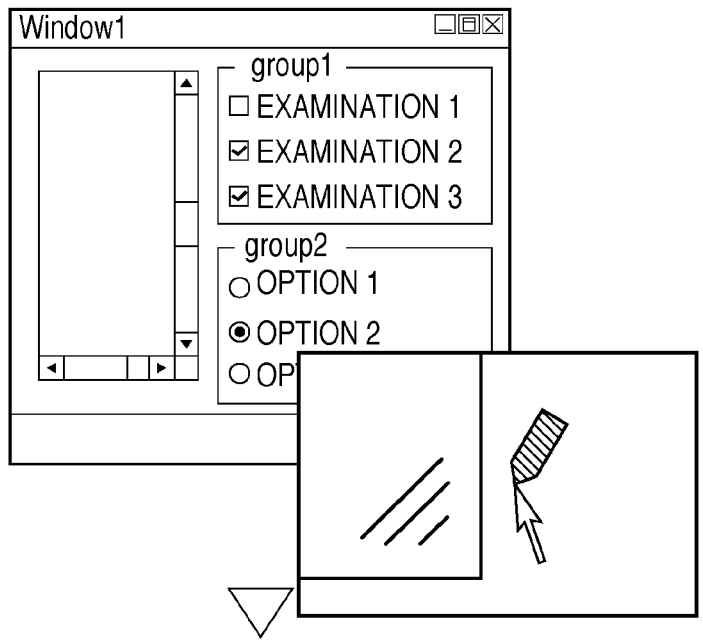
Figure 8C:
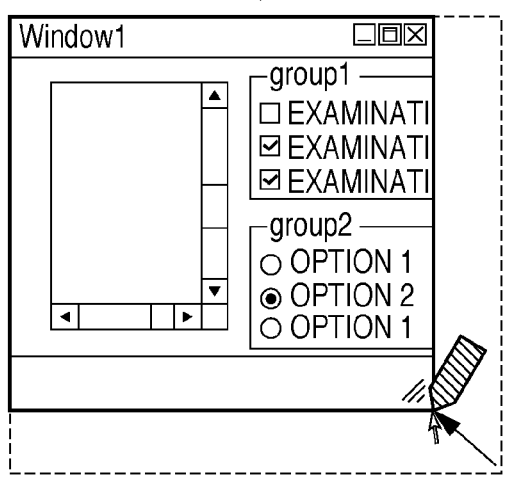

FIGS. 8A to 8C are diagrams illustrating transition of the display in a case where a window resizing area has been designated as the enlargement target and the enlargement cancellation operation has been designated as pen-down.

In FIG. 8A, when the moving speed of the input coordinates is equal to or greater than V1 and equal to or less than V2 and, moreover, the distance to the window resizing area is equal to or less than A1, the enlarged display is presented with the position of the input coordinates as the center, as shown in FIG. 8B (S201 to S204). In FIGS. 8B and 8C, the window resizing area is operated on the enlarged display area and pen-down is performed, whereupon the enlargement is cancelled (S301 to S307). Owing to cancellation of enlargement, the window size can be changed while the overall balance of the screen is observed. It should be noted that it is also possible to so arrange it that cancellation is performed by pen-up. In this case, however, enlargement is not cancelled while window size is being changed and hence it is difficult to decide the window size while observing the overall balance.

FIGS. 9A to 9E are diagrams illustrating transition of the display in a case where the close button and window resizing area have been designated as the enlargement targets, the close-button enlargement cancellation operation has been designated as pen-up and the enlargement cancellation operation for the window resizing area has been designated as pen-down.

Figure 9A:
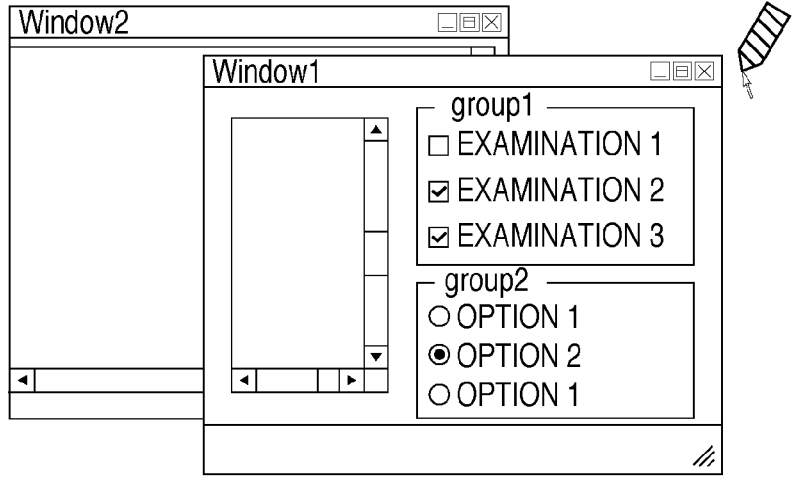
FIGS. 9A to 9E are diagrams illustrating an example of the transition of the display in the processing shown in FIGS. 5 and 6.
Figure 9B:
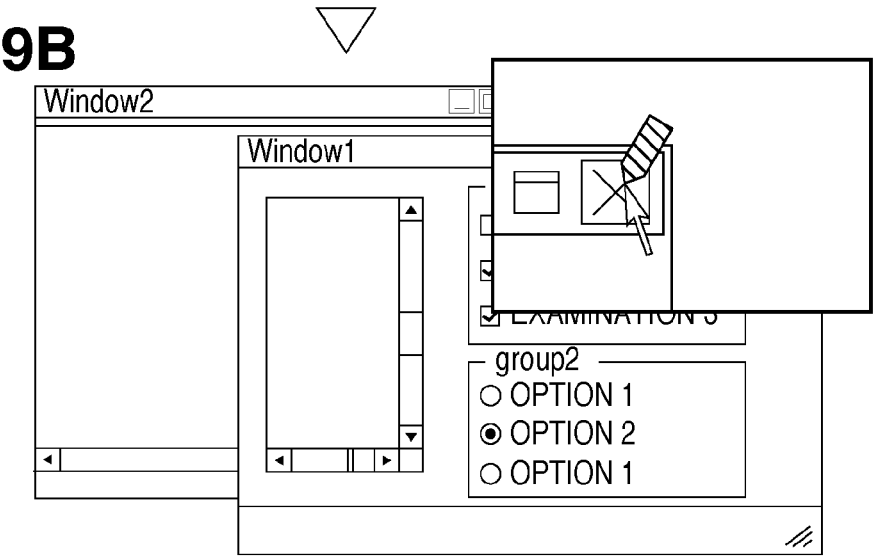
Figure 9C:
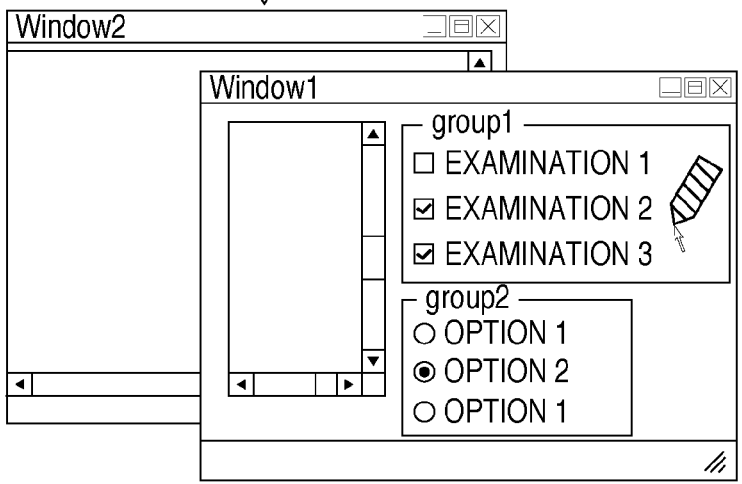
Figure 9D:
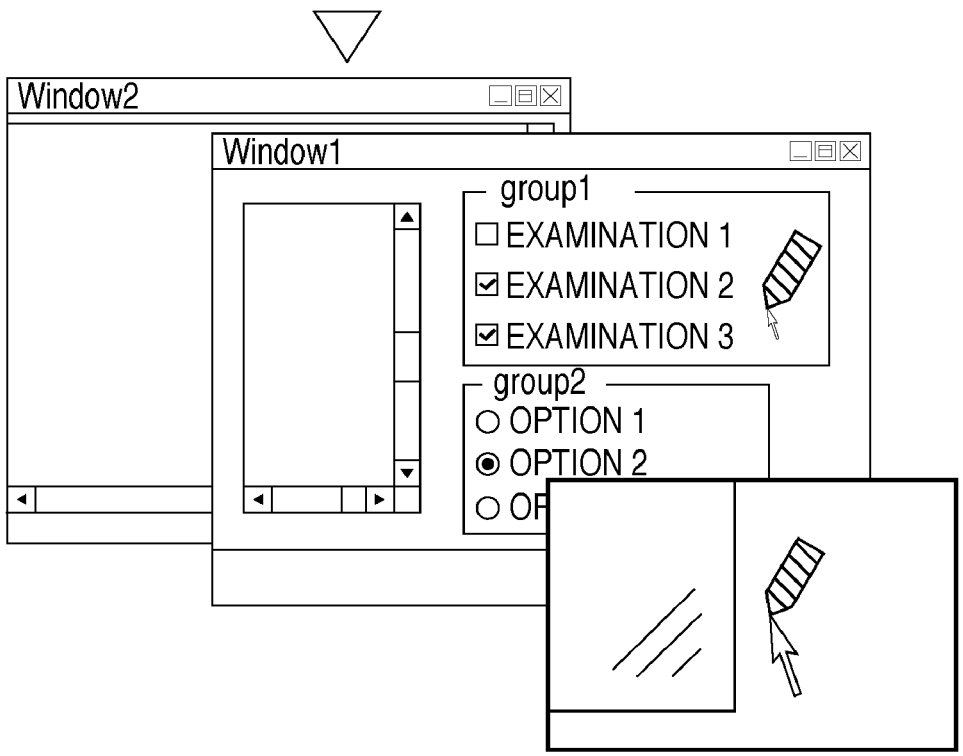
Figure 9E:
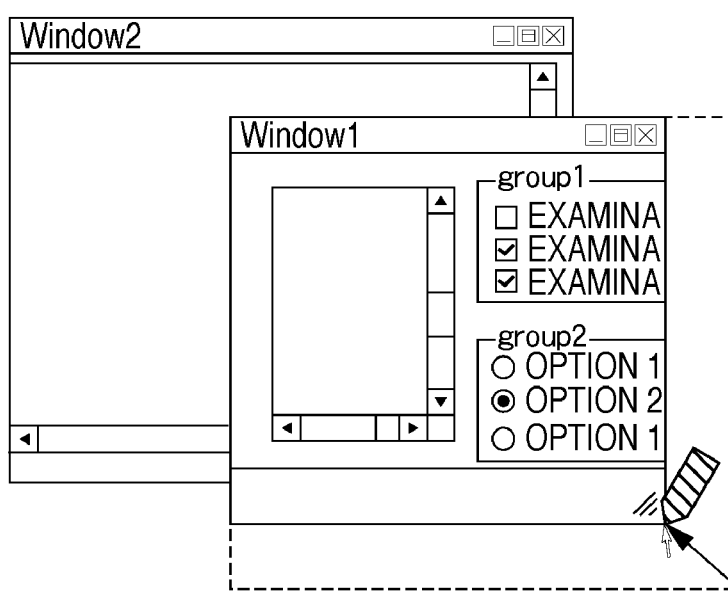

In FIG. 9A, the pen 202 is operated so that the input coordinates are made to approach the vicinity of the close button. In FIG. 9B, the input coordinates come close to the vicinity of the close button, whereby the close button is displayed in enlarged form (S201 to S204). In FIG. 9C, the pen 202 is withdrawn from the close button without the pen-down operation being performed. At this time the enlargement of the vicinity of the close button is cancelled ("NO" at S303; "NO" at S201; and S206 to S208). In FIG. 9D, the input coordinates are made to approach the window resizing area, whereupon the vicinity of the window resizing area is enlarged (S201 to S204). In FIG. 9E, the pen is placed down (pen-down) in the enlarged window resizing area, whereupon the enlargement of this area is cancelled (S306, S307). If the pen 202 is moved in the pen-down state with the enlargement cancelled, the size of the window changes.

(Modifications)

In the description rendered above, it is stated that the enlargement target is designated by being enclosed using the pen 202 when the enlargement target is set. However, this does not impose any limitation. For example, it may be so arranged that a list of one or a plurality of enlargement target candidates is displayed and the enlargement target is set by making a selection from the list. In this case, the enlargement targets (e.g., a close button, maximize button, minimize button, window sizing button, etc.) are registered in the display device 201 beforehand and the user makes a designation among these to thereby select the enlargement target.

Further, in the description rendered above, a case is described where a selection is made from among pre-registered candidates for the cancellation operation when the enlargement cancellation operation is set. However, it may be so arranged that the cancellation operation is set by inputting a prescribed operation that cancels enlargement by operating the pen 202. A new cancellation operation can also be registered by this method.

A transition of the display in this case will be described with reference to FIGS. 10A to 10C. Here a case where the window resizing area has been designated as the enlargement target will be taken as an example. It should be noted that the flow of processing is substantially similar to that shown in FIG. 3. This modification differs in that a list of enlargement target candidates shown in FIG. 10B is displayed at S102, and in that the processing of S103 is unnecessary.

Figure 10A:
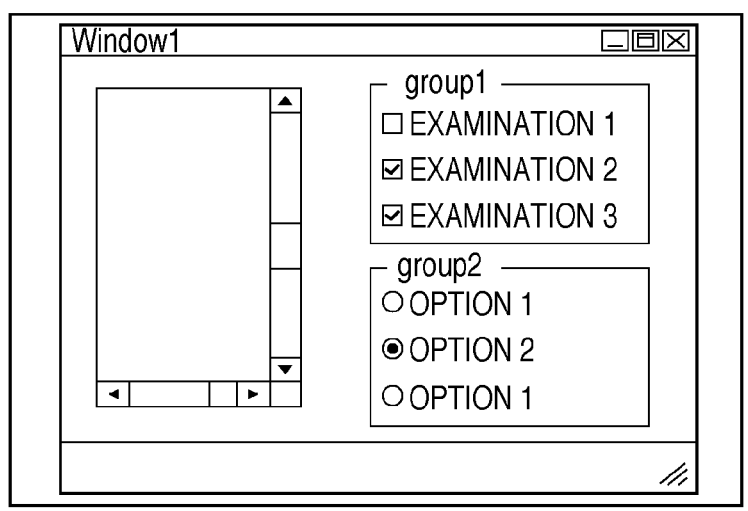
FIGS. 10A to 10C are diagrams illustrating examples of modifications.
Figure 10B:
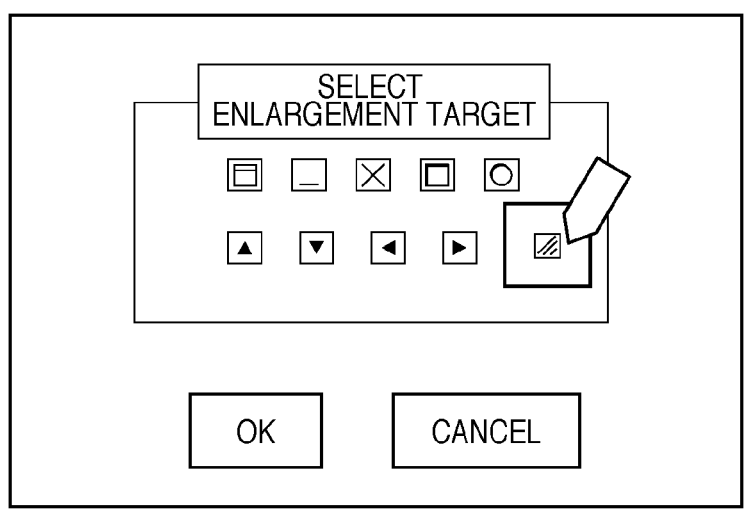
Figure 10C:
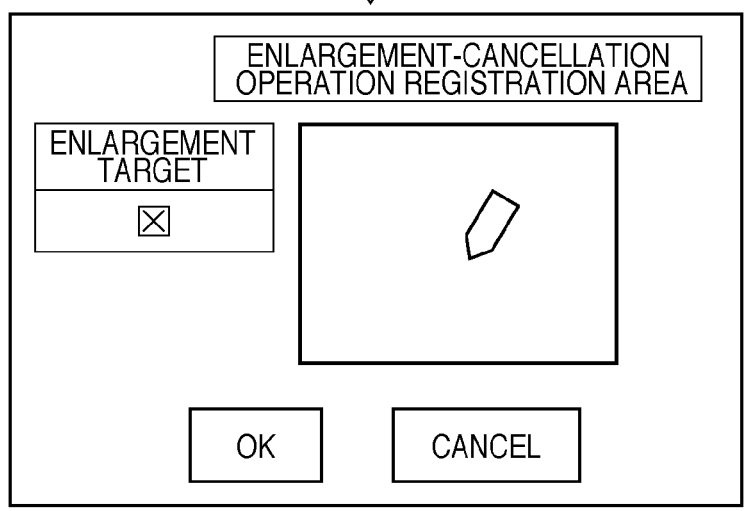

In FIG. 10A, a transition is made to the enlargement-target setting mode, whereupon the display device 201 provides a user interface on which a list of enlargement target candidates is displayed (S101 and S102). In FIG. 10B, the window resizing area is selected from the list by the user and the OK button is pressed. In FIG. 10C, the display device 201 accepts the selection operation and the pressing of the button and provides a user interface for inputting an operation that is for canceling the enlargement of the window resizing area (S104). Thereafter, if the user performs a specific input operation for canceling enlargement in an operation registration area on the interface, then the display device 201 registers the input operation, together with enlargement target selected from the list, as settings information (S105). An example in which pen-down has been input is illustrated in these drawings. It should be noted that if the OK button is pressed after pen-up is performed in the pen-down area, there is a possibility that the series of pen-down and pen-up operations will happen to be registered as an operation for canceling enlargement. In a case where pen-down is registered, it will suffice to perform pen-down in the operation registration area for enlargement cancellation, drag the pen as is, move the pen out of the area, perform pen-up and then press the OK button. In a case where pen-up is registered, it will suffice to drag the pen as is into the enlargement-cancellation operation registration area from outside this area, perform the pen-up operation and then press the OK button.

It may be so arranged that when the list of candidates for enlargement target is displayed, parts that will be enlargement-target candidates on the display screen are extracted using pattern matching or the like, and only the extracted parts are displayed as the enlargement-target candidates. More specifically, all parts need not be displayed in the list uniformly as candidates for enlargement target. Instead, if there is no slider on the display screen, the display may be presented upon removing the slider from the list of candidates for enlargement target.

Further, in the description above, coordinate input by the pen 202 is described. For this reason, the coordinate input method using the coordinate input apparatus is one that designates absolute coordinates. However, the invention is not limited to this method and it is permissible to adopt a coordinate input method that designates relative coordinate as in the manner of a mouse.

Further, in the description rendered above, a case is described in which all processing relating to setting of an enlargement target, setting of a method of canceling enlargement, enlargement and cancellation of enlargement, etc., is performed by the display device 201. However, it may be so arranged that some or all of this processing is executed on the side of the personal computer 203. For example, the setting of an enlargement target and the setting of a method of canceling enlargement may be performed on the side of the personal computer 203, and the enlargement and cancellation thereof may be performed on the side of the display device 201. In this case, the processing described with reference to FIG. 3 us executed on the side of the personal computer 203. On the side of the personal computer 203, however, the display position of each part is recognized and therefore pattern recognition is unnecessary. Further, in this case, it is so arranged that the personal computer 203 notifies the display device 201 of the enlargement target and method of canceling enlargement, and the display device 201 executes the processing of FIGS. 5 and 6 (enlargement and cancellation of enlargement) based upon being so notified. At this time the information of which the display device 201 has been notified is held in the RAM 102, etc., of the display device 201, and the later recognizes part position, etc., based upon this information. It goes without saying that all processing relating to setting of an enlargement target and setting of a method of canceling enlargement shown in FIG. 3 and enlargement and cancellation of enlargement, etc. shown in FIGS. 5 and 6 can be executed on the side of the personal computer 203. Furthermore, the functions of the CPU 101 and display device 201 can be combined and applied to, e.g., a PDA (Personal Digital Assistant).

Thus, in accordance with the above-described embodiment, in a computer of heightened resolution, erroneous operation can be reduced even if an absolute-coordinate input apparatus (e.g., a digitizer or pen) or relative-coordinate input apparatus (e.g., a mouse) is utilized to perform an operation in an area in which a fine operation is required. Further, difficulties such as cursor motion slowing down or temporarily stopping in an area where this is not necessary do not occur. Furthermore, since an operation for canceling enlargement can be set individually with respect to each area, operations suited to the respective areas can be set. This improves operability.

Although an embodiment has been described above in detail, it is possible for the present invention to take on the form of a system, apparatus, method, program or storage medium, by way of example. Specifically, the present invention may be applied to a system constituted by a plurality of devices or to an apparatus comprising a single device.

The present invention includes a case where the functions of the foregoing embodiment are attained also by supplying a software program directly or remotely to a system or apparatus, reading the supplied program codes with a computer of the system or apparatus, and then executing the program codes. In this case, the program supplied is a program corresponding to the flowcharts illustrated in the drawings of the embodiment.

Accordingly, since the functional processing of the present invention is implemented by computer, the program codes per se installed in the computer also implement the present invention. In other words, the present invention also covers a computer program per se that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of computer-readable storage media for supplying the computer program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and a download can be made from the website to a recording medium such as a hard disk. In this case, the program downloaded may be a compressed file that contains automatically installable functions. Further, implementation is possible by dividing the program codes constituting the program of the present invention into a plurality of files and downloading the files from different websites. In other words, a WWW (World Wide Web) server that downloads, to multiple users, the program files that implement the functional processing of the present invention by computer also is covered by the scope of the present invention.

Further, it is also possible to encrypt and store the program of the present invention on a storage medium such as a CD-ROM and distribute the storage medium to users. In this case, users who meet certain requirements are allowed to download decryption key information from a website via the Internet, and the program decrypted using this key information is installed on a computer.

Further, not only are the functions of the foregoing embodiment implemented by executing the read program codes in a computer, but the functions of the embodiment may also be implemented in cooperation with an operating system or the like running on the computer. In this case, the operating system or the like executes some or all of the actual processing and the functions of the embodiment are implemented by this processing.

Furthermore, it may be so arranged that a program that has been read from a recording medium is written to a memory provided on a function expansion board inserted into the computer or provided in a function expansion unit connected to the computer. In this case, after a program has been written to the function expansion board or function expansion unit, a CPU or the like provided on the function expansion board or function expansion unit performs some or all of the actual processing.

In accordance with the present invention, operability relating to enlargement processing based upon a coordinate input operation is improved.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2007-292306, filed on Nov. 9, 2007, which is hereby incorporated by reference herein in its entirety.

What is claimed is:

1. A display device comprising:
   an acquisition unit configured to acquire coordinates on a display screen designated by a coordinate input apparatus;
   a registering unit configured to register an enlargement target which is to be enlarged;
   an enlargement processing unit configured to enlarge and display a partial area, which includes the enlargement target, if a positional relationship between coordinates acquired by said acquisition unit and a position at which the enlargement target, which has been registered by said registering unit, is displayed on the display screen satisfies a predetermined condition; and
   a cancellation processing unit configured to cancel the enlarged display of the partial area by said enlargement processing unit based upon an input from the coordinate input apparatus,
   wherein said enlargement processing unit enlarges the partial area that includes the enlargement target if a moving speed of the coordinates acquired by said acquisition unit is within a prescribed range of speeds and distance between the acquired coordinates and the enlargement target is equal to or less than a prescribed distance.

2. The device according to claim 1, wherein said registering unit extracts and registers an enlargement target from an image, which is being displayed on the display screen, based upon the coordinates acquired by said acquisition unit.

3. The device according to claim 1, wherein said registering unit registers an enlargement target based upon an operation by the user for selecting the enlargement target from one or a plurality of enlargement target candidates that have been registered in advance.

4. The device according to claim 1, wherein said cancellation processing unit cancels the enlarged display of the partial area if there has been no input from the coordinate input apparatus for a prescribed period of time or longer.

5. The device according to claim 1, further comprising a cancellation registering unit configured to register an enlargement cancellation operation for canceling enlargement;
   wherein said cancellation processing unit cancels the enlarged display of the partial area by said enlargement processing unit if the enlargement cancellation operation registered by said cancellation registering unit has been performed.

6. The device according to claim 5, wherein said cancellation registering unit registers a specific input operation by the coordinate input apparatus as the enlargement cancellation operation.

7. The device according to claim 5, wherein said cancellation registering unit registers the enlargement cancellation operation based upon an operation by the user for selecting the enlargement cancellation operation from one or a plurality of enlargement cancellation operation candidates that have been registered in advance.

8. The device according to claim 5, wherein said cancellation registering unit registers an enlargement cancellation operation, which is for canceling the enlarged display, for each enlargement target; and
   said cancellation processing unit cancels the enlarged display of the partial area by said enlargement processing unit if an enlargement cancellation operation which has been registered by said cancellation registering unit has been performed in relation to the enlargement target being enlarged and displayed.

9. The device according to claim 1, further comprising a converting unit, wherein if coordinates within an area enlarged and displayed have been acquired by said acquisition unit while the enlarged display of the partial area is being performed by said enlargement processing unit, said converting unit is configured to convert the acquired coordinates to coordinate information for the partial area prior to enlargement display.

10. A display processing method of a display device, the method comprising the steps of:
    acquiring coordinates on a display screen designated by a coordinate input apparatus;
    registering an enlargement target which is to be enlarged;
    enlarging and displaying a partial area, which includes the enlargement target, if a positional relationship between coordinates acquired in said acquiring step and a position at which the enlargement target, which has been registered in said registering step, is displayed on the display screen satisfies a predetermined condition; and
    canceling the enlarged display of the partial area in said enlarging and displaying step based upon an input from the coordinate input apparatus,
    wherein said enlarging and displaying step enlarges the partial area that includes the enlargement target if a moving speed of the coordinates acquired in said acquiring step is within a prescribed range of speeds and distance between the acquired coordinates and the enlargement target is equal to or less than a prescribed distance.

11. A display processing program stored on a non-transitory computer-readable medium for causing a computer to function as:
    an acquisition unit configured to acquire coordinates on a display screen designated by a coordinate input apparatus;
    a registering unit configured to register an enlargement target which is to be enlarged;
    an enlargement processing unit configured to enlarge and display a partial area, which includes the enlargement target, if a positional relationship between coordinates acquired by said acquisition unit and a position at which the enlargement target, which has been registered by said registering unit, is displayed on the display screen satisfies a predetermined condition; and
    a cancellation processing unit configured to cancel the enlarged display of the partial area by said enlargement processing unit based upon an input from the coordinate input apparatus,
    wherein said enlargement processing unit enlarges the partial area that includes the enlargement target if a moving speed of the coordinates acquired by said acquisition unit is within a prescribed range of speeds and distance between the acquired coordinates and the enlargement target is equal to or less than a prescribed distance.

* * * * *